United States Patent [19]

Nally

[11] 4,201,978
[45] May 6, 1980

[54] DOCUMENT PROCESSING SYSTEM
[75] Inventor: Robert B. Nally, Waterloo, Canada
[73] Assignee: NCR Canada Ltd. — NCR Canada Ltee, Mississauga, Canada
[21] Appl. No.: 953,046
[22] Filed: Oct. 19, 1978
[51] Int. Cl.$^2$ .............................................. G06K 9/04
[52] U.S. Cl. .............................. 340/146.3 C; 235/379; 340/146.3 D
[58] Field of Search ............... 340/146.3 C, 146.3 SY, 340/146.3 AE, 146.3 E, 146.3 D, 152 R; 235/380, 487, 379; 209/569

[56] References Cited

U.S. PATENT DOCUMENTS

| | | | |
|---|---|---|---|
| 3,594,727 | 7/1971 | Braun | 340/152 R |
| 4,020,463 | 4/1977 | Himmel | 340/146.3 AE |
| 4,027,142 | 5/1977 | Paup et al. | 235/379 |
| 4,048,618 | 9/1977 | Hendry | 340/146.3 E |

OTHER PUBLICATIONS

Nagel et al., "Steps Toward Handwritten Signature Verification", *Proc. of 1st International Joint Conf. on Pattern Rec.*: 1973, pp. 59–65.

*Primary Examiner*—Leo H. Boudreau
*Attorney, Agent, or Firm*—J. T. Cavender; Wilbert Hawk, Jr.; Richard W. Lavin

[57] ABSTRACT

A method and apparatus is disclosed for processing documents having human readable intelligent bearing written indicia located thereon and includes optical scanning means (46) for generating signals representing the pattern of the written indicia scanned by the scanning means. Means (40) also are provided for generating recognition data pertaining to certain characteristics of the written indicia associated with the owner of each document, which means includes an operator keyboard (26) for entering the location of the written indicia on the document, together with a number (60) identifying the owner, the number being located on the document and being used as an address in a storage unit (41) to store the recognition data generated which is employed in recognizing the characters of the indicia associated with the document. Subsequent processing of the owner's documents includes reading the identifying number on the document for use by a character recognition apparatus (46) to extract the appropriate recognition data from the storage unit stored at an address corresponding to the identifying number read for use in recognizing the written indicia on the document.

6 Claims, 9 Drawing Figures

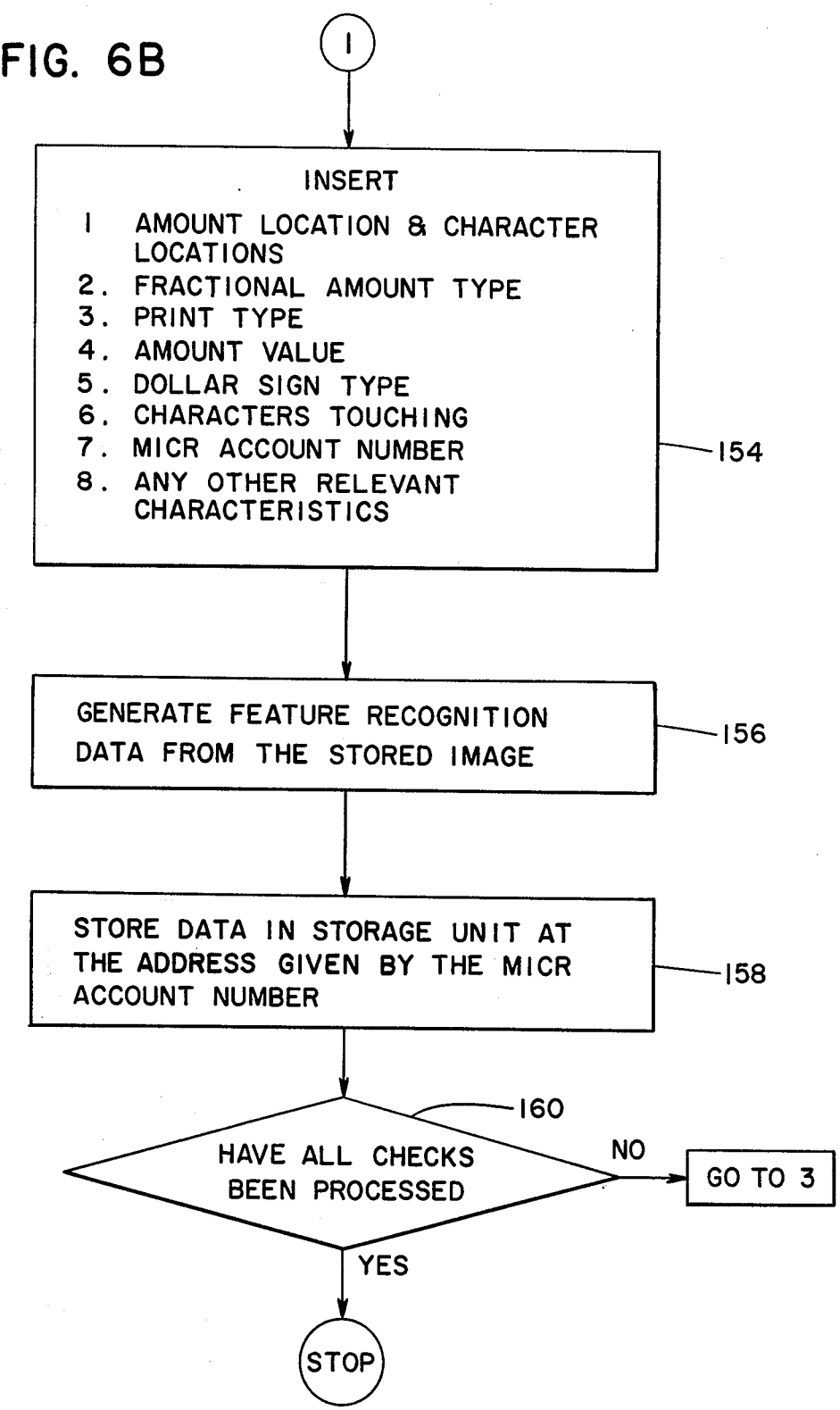

DOCUMENT PROCESSING SYSTEM

BACKGROUND OF THE INVENTION

This invention relates to the control and processing of documents such as bank checks and more particularly to the automatic reading of handwritten amount characters located on bank checks for use in processing such checks through the banking system.

The processing of checks includes the sorting, distribution and proving of all deposit transactions arising from the commerical operations of the bank. The sorting of checks includes separating the checks in accordance with the bank the check is drawn on. Further processing includes the imprinting of the amount of check directly on the check for confirming such amount. Modern document processing systems encompass all item processing objectives including the listing and balancing of amounts for use in proving the documents, encoding information on the checks for use in distributing the checks, endorsing, microfilming, sorting and distributing the checks in accordance with their final destination. The cost of such processing in considerable, and many systems have been devised to reduce the cost of such processing. As a result of these endeavors, magnetic printing and readers have been employed, together with optical character recognition apparatus, for reading particular machine-printed characters.

In spite of these attempts, checks processed in today's banking systems still require manual encoding of the amount of the check in magnetic ink on the check with contributes to the high cost of such an operation. Various systems have been proposed in the past for reading handwritten characters. While the recognition systems themselves have been proved to be workable, the variations in the handwritten characters of all customers of a bank have been of such magnitude that the cost of operating such a system would be greater than the manual encoding of such amounts. It is therefore a principal object of this invention to provide an improved method and apparatus for reducing the cost of processing written documents such as bank checks and the like. It is a further object of this invention to provide a method and apparatus for processing bank checks in which the handwritten amounts are optically read and recognized.

SUMMARY OF THE INVENTION

In order to carry out these objects, there is provided a system for processing checks in which a number of specimens of a customer's checks are processed and analyzed with respect to the handwritten characters comprising the amount field for generating data which is to be used in recognizing such characters. The character recognition data is stored in a storage unit at an address which comprises the account number of the customer. The operator also keys in at the same address, data representing the location on the check of the written amount character field together with other features of the written characters for use in recognizing the character. After sufficient data has been stored in the storage unit to allow for the recognition of all the characters that are capable of being handwritten, the system will process the checks by reading the account number magnetically, optically reading and recognizing the handwritten amount characters using the data stored in the storage unit at the address corresponding to the account number read. The amount characters recognized by the system will then be encoded on the check for further processing.

BRIEF DESCRIPTION OF THE DRAWINGS

FIGS. 6A-6D inclusive comprise a flowchart of the operation of the system embodying the present invention.

DESCRIPTION OF THE PREFERRED EMBODIMENT

Figure 1:
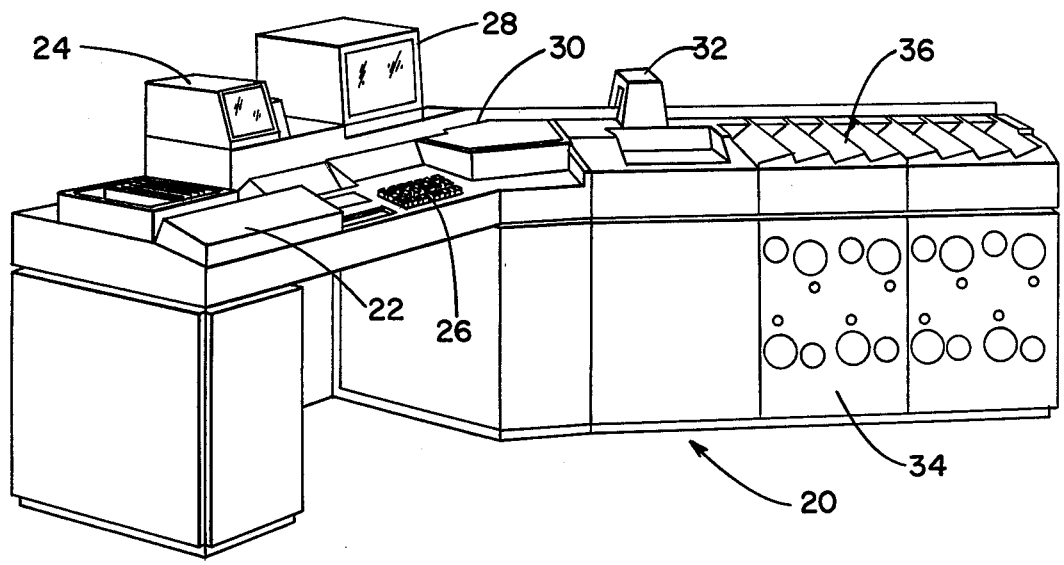
FIG. 1 shows a check processing apparatus to which the present invention pertains.

Referring now to FIG. 1, there is shown a view of a distributive process apparatus 20 used in processing bank checks and other documents which may be an NCR 7750 proof system manufactured by the NCR Corporation of Dayton, Ohio and used in bank proof operations. Included in the apparatus 20 is a hopper module 22 in which documents to be processed are fed seriatim into a document transport (not shown) located within the apparatus 20, said documents being inserted either manually or automatically for movement through the apparatus 20, a display unit 24 for displaying data read from the document or inserted from a keyboard 26, a CRT display unit 28 for displaying the face of the document being transported through the apparatus 20, a MICR (magnetic ink character recognition) reader 30 for reading magnetic characters printed on the document, a microfilm unit 32 for microfilming the document and a sorting module 34 comprising a plurality of storage pockets 36 in which documents are sorted and stored according to their final destination. Located within the framework of the apparatus 20, adjacent the feed path of the documents but not seen in FIG. 1, are a journal printer for producing a complete record of the documents processed by the apparatus 20, an encoder for printing on a document control characters used in processing the document and a bank endorser for endorsing the documents processed. Also included within the apparatus 20 is an optical character reader and an image lift unit for scanning the face of the document and generating signals used for displaying the face of the document on the CRT 28. As part of a proof operation, the amount appearing on the document must be read for printing on the journal record and for printing on the document itself for further processing operations. The present method generally employed in proof operations requires the operator to read the amount as contained on the face of the document and through the use of the keyboard 26 cause the printing of such amount on the journal and the document. The present invention is directed to the automatic reading of the handwritten amount character field appearing on the document in order to increase the speed of the document through the apparatus 20 and to reduce errors found in present-day operator controlled amount recording operations.

Figure 2:
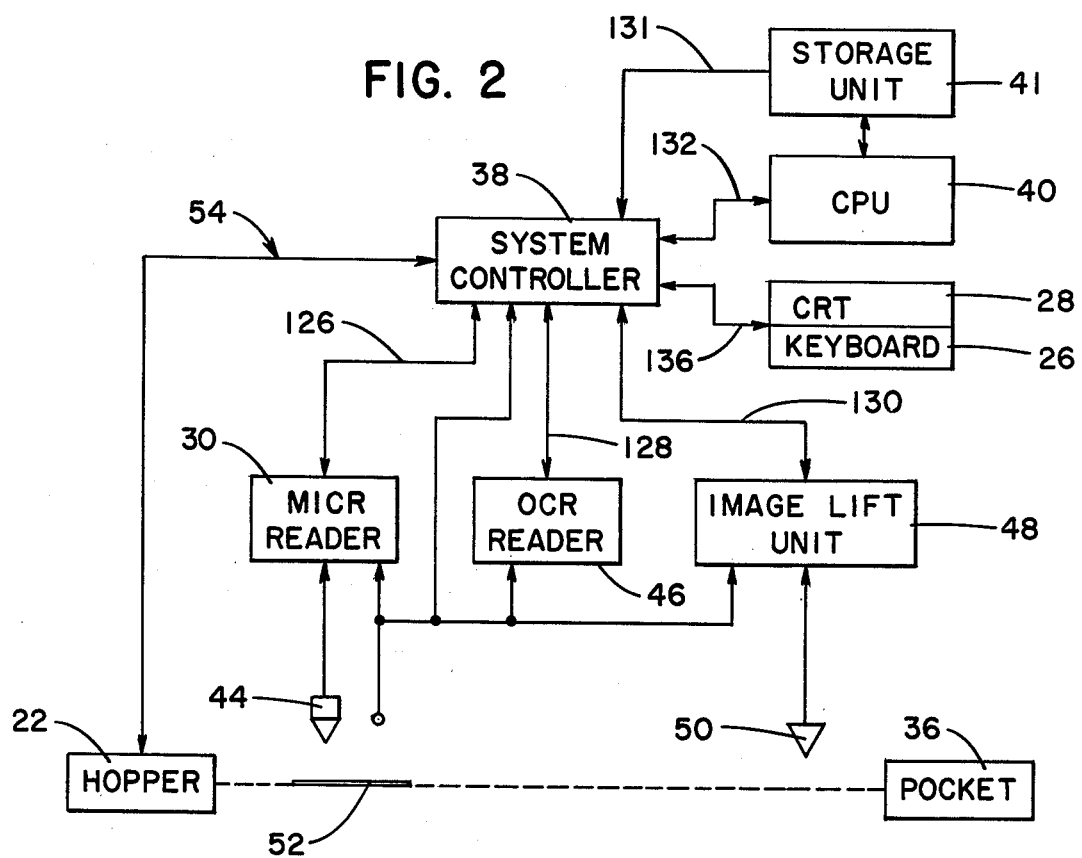
FIG. 2 is a schematic block diagram of the check processing system embodying the invention.

Referring now to FIG. 2, there is shown a block diagram of the system for reading the handwritten amount character field located on a document utilizing the present invention. Included in the system whose elements are located within the apparatus 20 (FIG. 1) is a system controller 38 for controlling the various modules of the read system, a pattern recognition central processing unit (CPU) 40 for generating feature recognition data used in recognizing handwritten amount characters on the document, in which CPU data used in recognizing the handwritten amount characters appearing on the document are stored, the CRT 28 in which the face of the document being processed is displayed to enable the operator to analyze certain characteristics of the handwritten amount characters appearing on the document, the keyboard 26 for use by the operator in inserting into a storage unit 41 data pertaining to the location and to certain feature characteristics of the handwritten amount characters observed when viewing the document displayed on the CRT 28, the MICR reader 30 and its associated sensing unit 44 for magnetically reading magnetic characters printed on the document which identify the owner of the document, an optical character reader 46 for optically reading the handwritten amount characters appearing on the document, an image lift unit 48 and its associated sensing units 50 for scanning the face of the document and generating signals used in displaying the face so scanned by the image lift unit 48 on the CRT 28, the hopper module 22 for storing and initiating the feeding of a document 52 through the apparatus 20 and the storage pockets 36 for use in sorting the processed documents. Each of the blocks shown in FIG. 2 are interconnected by a common bus system 54 which may include data, control and address bus lines in a manner that is well-known in the art.

Figure 3:
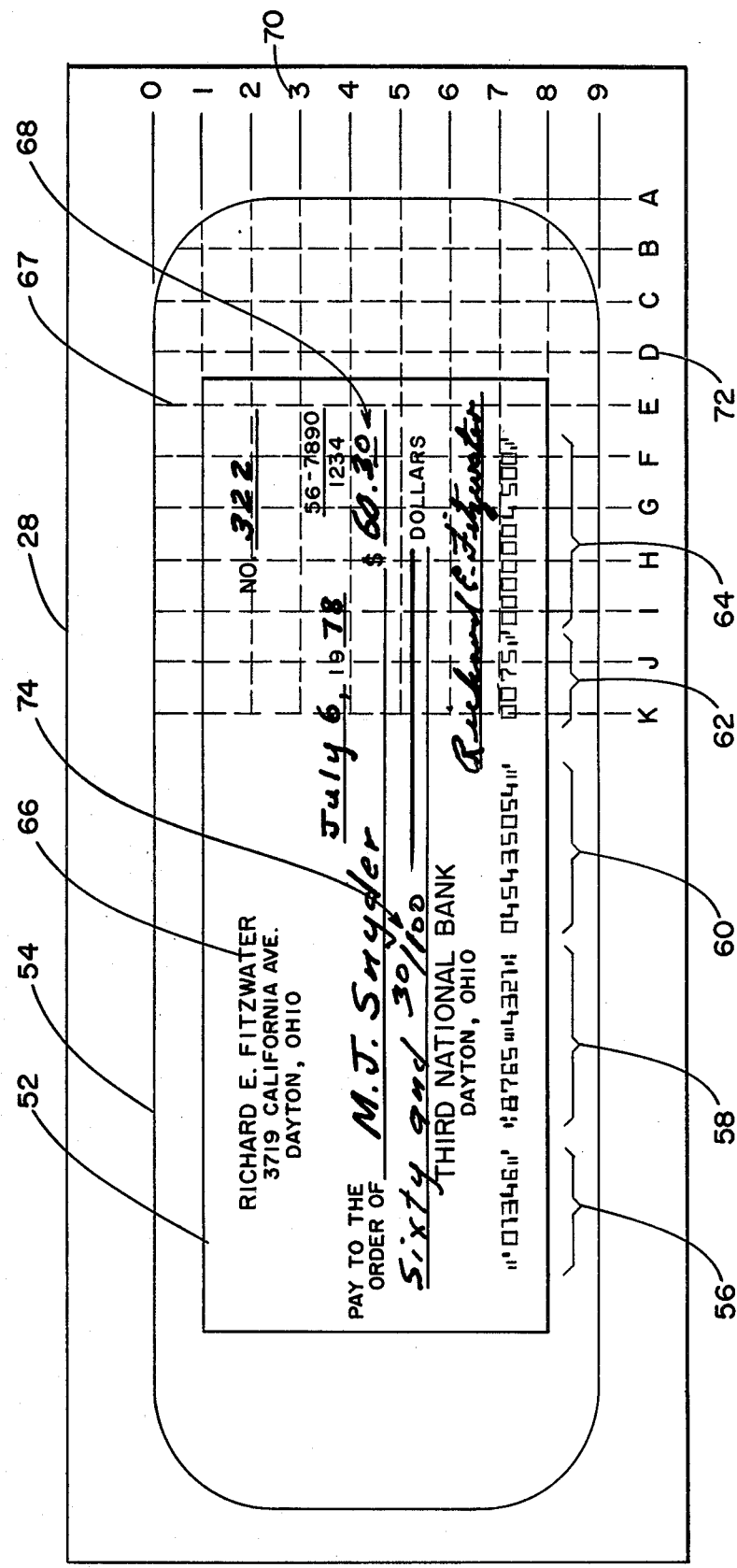
FIG. 3 is a diagrammatic representation of the face of the CRT showing the projection of a check on the face of the tube and the grid pattern used in determining the location and other characteristics of the written amount character field.

Referring now to FIG. 3, there is shown an example of the face of a document 52 such as a bank check being displayed on the face or screen 54 of the CRT 28. It will be seen on the bottom of the check 52 that there are three data fields which may include a consecutive number field 56, the SR-ABA transit routing number field 58, the account number field 60 and the combined transaction code 62 and the amount number field 64. Normally the fields 56–60 inclusive are preprinted together with the depositor's name 66 and address. The fields 62 and 64 are printed during a proof operation in which the present invention is utilized. Also shown on the check 52 is the handwritten amount character field 68 which is to be read by the system illustrated in FIG. 2.

Located on the face 54 of the CRT 28 is a grid pattern 67 having horizontally aligned numerical designations 70 and vertically aligned alphabetic designations 72. As will be described more fully hereinafter, the operator will key in data for storage in the storage unit 41 by means of the keyboard 26, which data locates the written dollar amount field 68 on the face of the check utilizing the designations 70 and 72. The grid pattern 67 may be scribed on the face 54 of the CRT 28 or displayed thereon.

Figure 4:
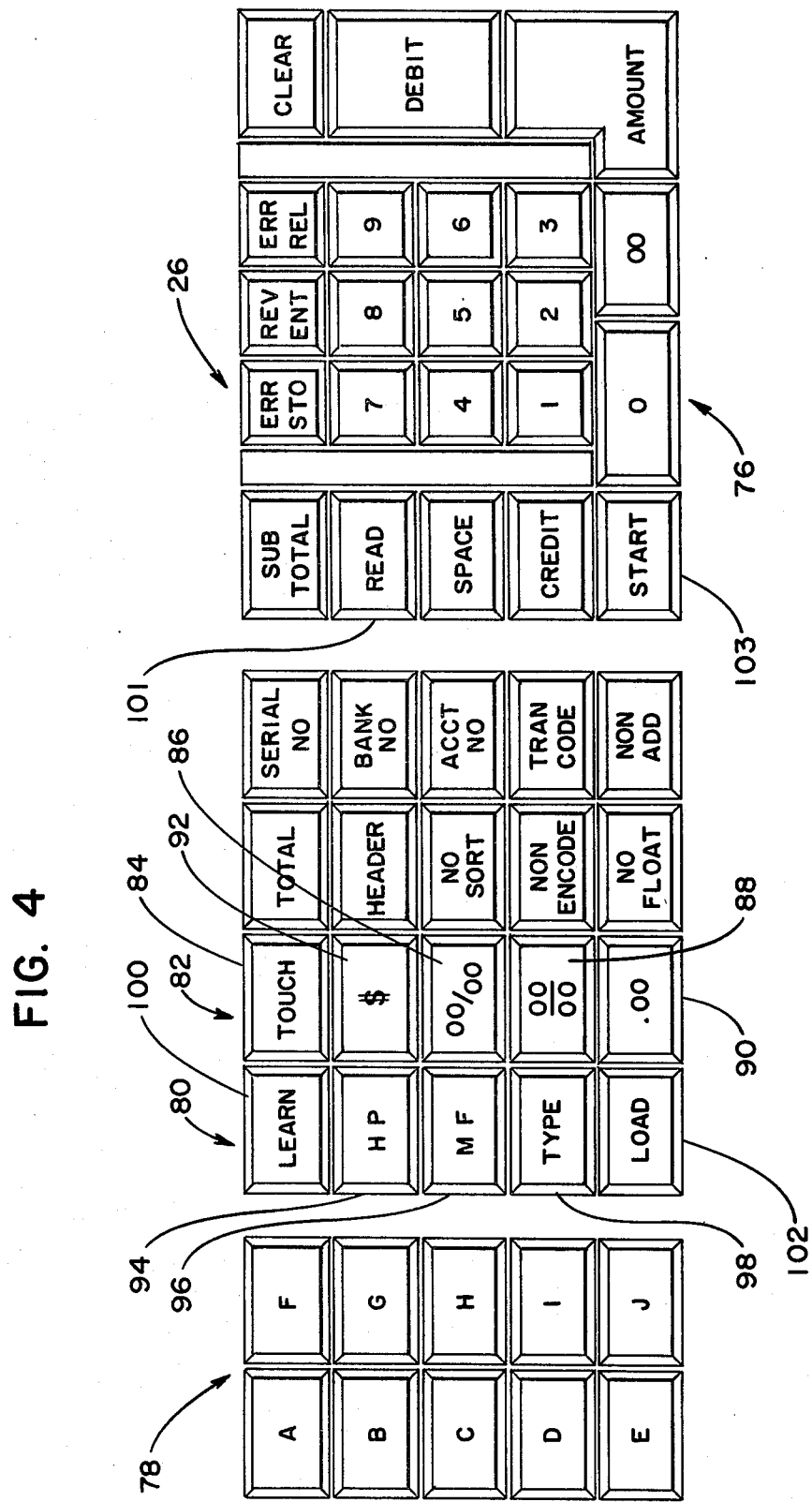
FIG. 4 is a diagrammatic view of the keyboard of the apparatus shown in FIG. 1.

Referring now to FIG. 4, there is shown a plan view of the keyboard 26 which includes a ten key keyboard section generally indicated by the numeral 76 for use by the operator in inserting the numerical designations 70 associated with the grid pattern 67 (FIG. 3) into the storage unit 41 (FIG. 2). Also included on the keyboard 26 is an alphabetic key section generally indicated by the numerical designation 78 for use in inserting the alphabetic designations 72 associated with the grid pattern 67, together with two rows of control keys generally indicated by the numerical designations 80 and 82 for use by the operator in processing the document 52 (FIG. 3). These control keys, together with the key sections 76 and 78, are used for inserting data pertaining to feature characteristics of the handwritten amount character field 68 found on the face of the document 52 and used by the apparatus 20 (FIG. 1) in reading the handwritten amount character field 68 (FIG. 3).

As part of the processing operation, the operator in viewing the face of the document 52 displayed on the CRT 28 will key in the location of the handwritten amount character field 68 using the key sections 76 and 78. The operator will also depress the control key 84 labeled "TOUCH" if any of the written amount characters are touching. An example of this is found in the amount written characters field 68 of FIG. 3 in which the 6 and the 0 are shown to be touching. The operator will then depress one of the control keys 86, 88 and 90 labeled 00/00, 00/00 and .00 respectively, indicating the form of the written fractional amount appearing in the amount field 68. Again, looking at the face of the document 52 in FIG. 3, it will be seen that the fractional amount as indicated by the numeral 74 will correspond to the control key 86 while the fractional amount appearing in the amount field 68 will correspond to the control key 88. When either of these fractional amount forms appears in the amount character field 68, the operator will depress one of the corresponding control keys 86–90 displaying the appropriate fractional amount form.

Further observing and inspecting the face of the document 52, the operator will depress the control key 92 labeled $ if the dollar sign is present, key 94 labeled "HP" if the amount characters are hand printed, the key 96 labeled "MF" if the amount is printed in machine font and the key 98 labeled "TYPE" if the amount is typewritten. When the proof apparatus 20 (FIG. 1) is to be operated in a learn mode, the operator will depress the control key 100 (FIG. 4) while the depression of the control key 102 initiates the feeding of a document into the transport system (not shown) of the apparatus 20 into which the amount character field 68 is automatically read for printing in the amount field 64 (FIG. 3) located at the bottom of the check 52 and also on an amount journal record (not shown) located within the apparatus 20. The remaining control keys shown in FIG. 4 include key 101 labeled "READ" which is used for initiating a processing operation, key 103 labeled "START" which is used to initiate the feeding of a document through the apparatus 20 (FIG. 1) or initiate further machine operations, while the remaining keys are those utilized during a normal bank proofing operation and are not necessary to an understanding of the present invention.

Figure 5:
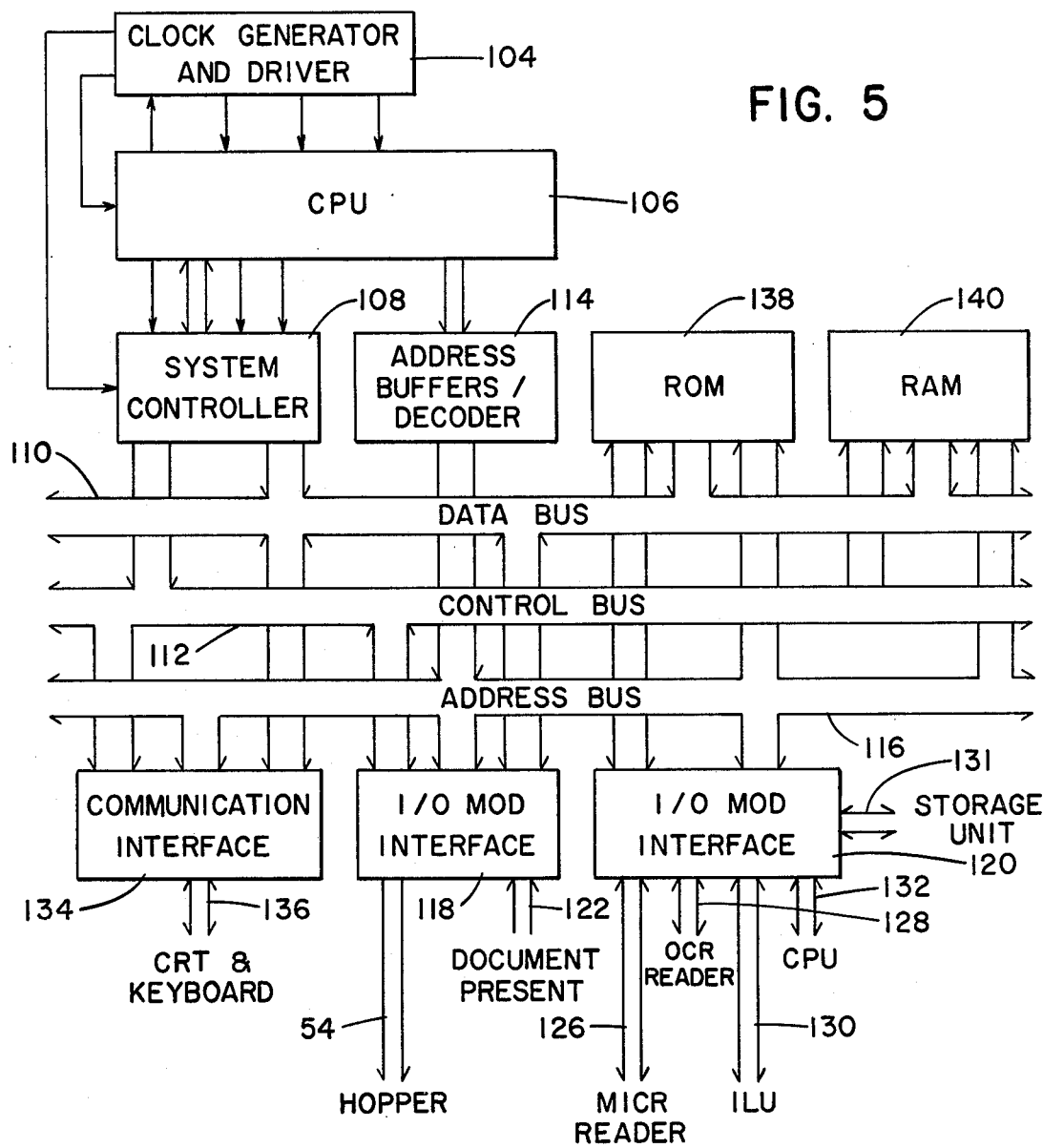
FIG. 5 is a schematic block diagram of the system controller shown in FIG. 2.

Referring now to FIG. 5, there is shown a block diagram of the system controller 38 (FIG. 2) which may include a clock generator and driver 104 for outputting clock signals to a central processing unit (CPU) 106 and a system controller 108 for generating the required control signals to operate the apparatus 20 in reading the amount character field 68 (FIG. 3) on the document 52. The CPU 106 may be an INTEL 8080 microprocessor manufactured by the Intel Corporation of Santa Clara, Calif. The clock generator 104 may be an INTEL 8224, while the system controller 108 may be an INTEL 8228 module.

The system controller 108 is coupled to an eight bit data bus 110 and a six bit control bus 112 over which data is transmitted to the appropriate modules shown in FIG. 2 together with those shown in FIG. 5 in a manner that is well-known in the art. The CPU 106 is also coupled to an INTEL 8212 address buffer/decoder 114 for selecting the appropriate module in the apparatus 20 during the operation of the system. The address buffer/decoder 114 is coupled to an address bus 116 and to INTEL 8255 I/O module interfaces 118 and 120 for use in addressing the various modules located in the apparatus 20. The interface 118 receives signals over bus 122 indicating the presence of a document 52 in the transport section of the apparatus 20 and transmit a control signal to the hopper module 22 (FIG. 1) for controlling the feeding of the documents 52 (FIG. 3) from the hopper module into and through the transport portion of the apparatus 20.

The interface 120 transmit appropriate control signals over a bus 126 to operate the MICR reader 30 (FIG. 2) for reading the account number field 60 on the document 52. The interface 120 also communicates over bus 128 with the OCR reader 46 (FIG. 2) in the apparatus 20 for reading the amount character field 68 (FIG. 3) on the document 52 and over bus 130 to the image lift unit 48 (FIG. 2) for scanning the face of the document 52 and generating the appropriate signals for controlling the CRT 28 to display the document on the face 54 of the CRT 28. The interface 120 is further coupled over bus 131 with the storage unit 41 (FIG. 2) for transmitting data generated by the operation of the keyboard 26 (FIG. 2), the OCR reader 46 and the MICR reader 30, and over bus 132 to the CPU 40. The CPU 40 is of the type which, upon receiving from the OCR reader 46 binary data representing the pattern of the amount character field 68 (FIG. 3) when in a learning mode, will generate feature recognition characteristics of each of the handwritten characters scanned by the OCR reader 46 for use in recognizing the characters when they are subsequently read by the OCR reader 46 (FIG. 2) during a proof operation. Examples of such character recognition systems may be found in U.S. Pat. Nos. 3,267,431; 3,457,552 and 4,066,999. Each of these patents disclose recognition processors which, when in a learning mode, will generate feature recognition characteristics of each amount character read to be used in recognizing the character in a subsequent processing operation.

Again referring to FIG. 5, the system controller 38 of FIG. 2 further includes an INTEL 8250 I/O communication interface 134 for transmitting control data to the CRT 28 for use in controlling the displaying of the face of the document 52 scanned by the OCR reader 46 (FIG. 2) and for receiving data from the keyboard 26. The system controller 38 (FIG. 2) also includes an INTEL 8702 ROM unit 138 in which are stored instructions for operating the various modules of the apparatus 20 (FIG. 1) and the CRT grid pattern 67 (FIG. 3) and an INTEL 8210 RAM unit 140 in which are temporarily stored the feature recognition characteristics data and amount field location data associated with the document 52 being processed and transferred from the storage unit 41 (FIG. 2) in accordance with the account number of the document read by the MICR reader 30 (FIGS. 1 and 2) for use in reading the document being scanned by OCR reader 46, the digital image of the scanned document 52 and the resulting data generated by the processing operation for use in subsequently printing the amount of the data on the document.

Referring now to FIGS. 6A-6D inclusive, there is shown in flowchart form a method of processing a document such as a bank check through the apparatus 20 (FIG. 1) as part of a bank proof operation. A number of checks written by a customer and preferably containing examples of all the written numerical characters 0-9 inclusive is obtained (block 142) and loaded (block 144) into the hopper module 22 (FIGS. 1 and 2). The operator then depresses the "LEARN" control key 100 (FIG. 4) which will set the system into a learn mode (block 146). The operator will then depress the "LOAD" control key 102 (FIG. 4) releasing one document from the hopper module 22 (FIG. 1) (block 148) into the transport mechanism which will transport the document past the OCR reader 46 which scans the face of the document for storing the digital image of the face of the document in the RAM unit 140 (FIG. 5) (block 150). The system controller 108 (FIG. 5) will then transmit the data from the RAM unit 140 through the communication interface 134 to the CRT 28 (FIG. 1) for displaying the face of the document on the CRT 28 (block 152).

Upon the displaying of the document on the CRT 28, the operator will view the document and with the use of the keyboard 26 (FIG. 1) will insert data (block 154) (FIG. 6B) describing the location and other feature characteristics of the amount character field 68 (FIG. 3). As part of this operation step, the operator utilizing the ten key section 76 (FIG. 4) and the alphabetic key section 78 of the keyboard 26 will insert the location of the amount character field 68 (FIG. 3) into the RAM unit 140 (FIG. 5). The operator will also key in the actual dollar amount of the document. Utilizing one of the control keys 86-90 (FIG. 4), the operator will identify the type of fractional amount that is present in the field 68. Using control keys 94-98 inclusive, the operator will identify the type of print that may appear in the amount character field 68. The operator also utilizes control key 84 if the amount characters are touching each other, control key 92 if the dollar sign is present in the amount field, the ten key keyboard section 76 for inserting the account number found in the account number field 60 if, for some reason, the account number is not found on the face of the check, and any other relevant characteristics which may be used in identifying the amount characters found in the amount character field 68 (FIG. 3). The system controller 38 (FIG. 2) will transfer the data contained in the RAM unit 140 to the character recognition CPU 40 for generating (block 156) the feature recognition characteristics for the amount characters displayed on the CRT 28 and store these recognition characteristics in the storage unit 41 (FIG. 2) together with those features found in block 154 at an address corresponding to the account number read by the MICR reader 42 (block 158). The system will then check (block 160) to see if this is the last document present by means of a control signal transmitted over bus 122 (FIG. 5) from the hopper 22 (FIG. 1) to the I/O module interface 118 indicating that a document is still to be processed. If the signal indicates that another document is still to be processed, the document is released from the hopper 22 (FIG. 1) (block 148) and the scanning process is repeated until all the documents have been scanned and the recognition data generated from the scanning process has been stored in the storage unit 41 at the address corresponding to the account number of the document read by the MICR reader 30.

This process is repeated for each customer of the bank until there is stored in the storage unit 41 sufficient data to allow the system to read the amount character field 68 (FIG. 3) utilizing the recognition data stored in the storage unit 41 at an address corresponding to the account number of each of the customers of the bank. It is obvious that other data pertaining to feature characteristics of the document such as background (plain, scenic, color, etc.) may be generated utilizing the keyboard 26 for use by the system in reading the amount character field 68.

Figure 6A:
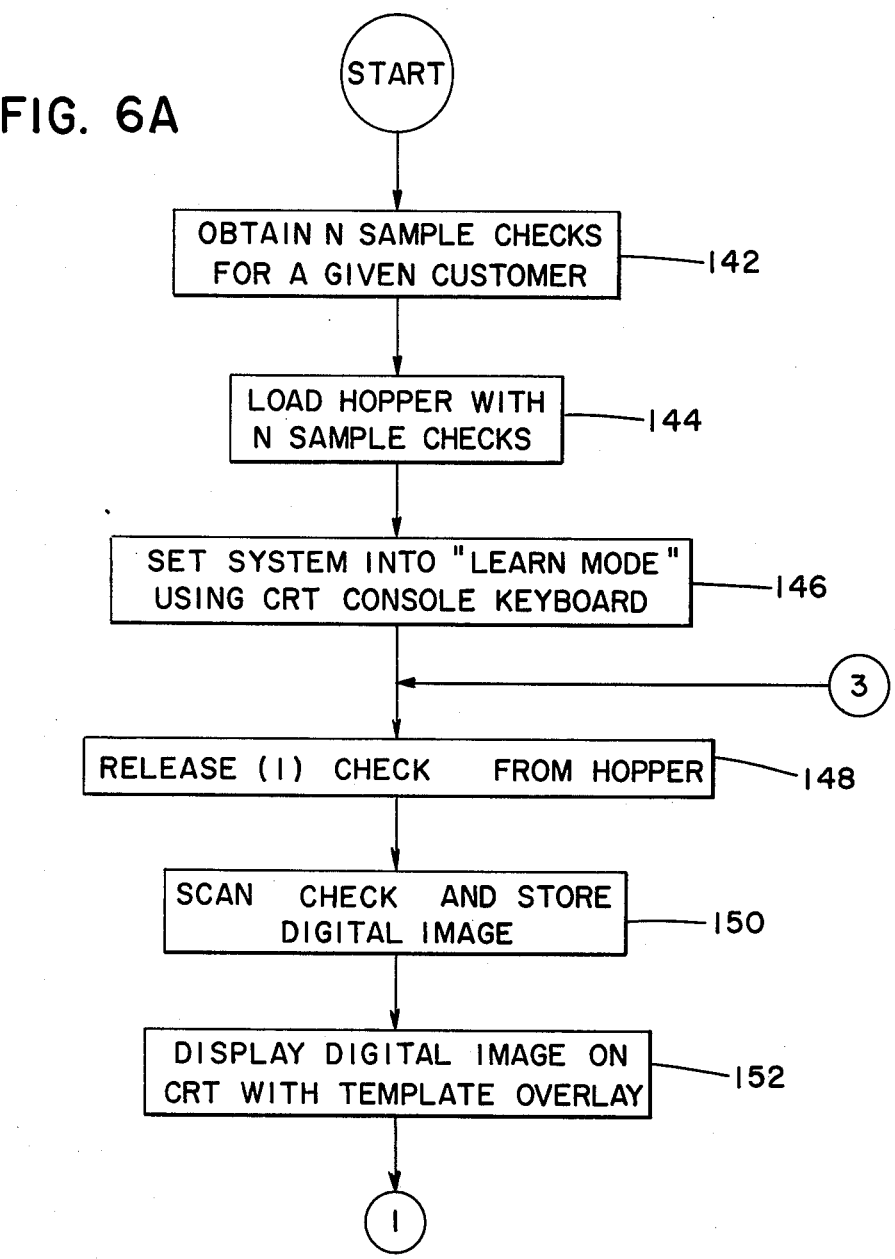
Figure 6C:
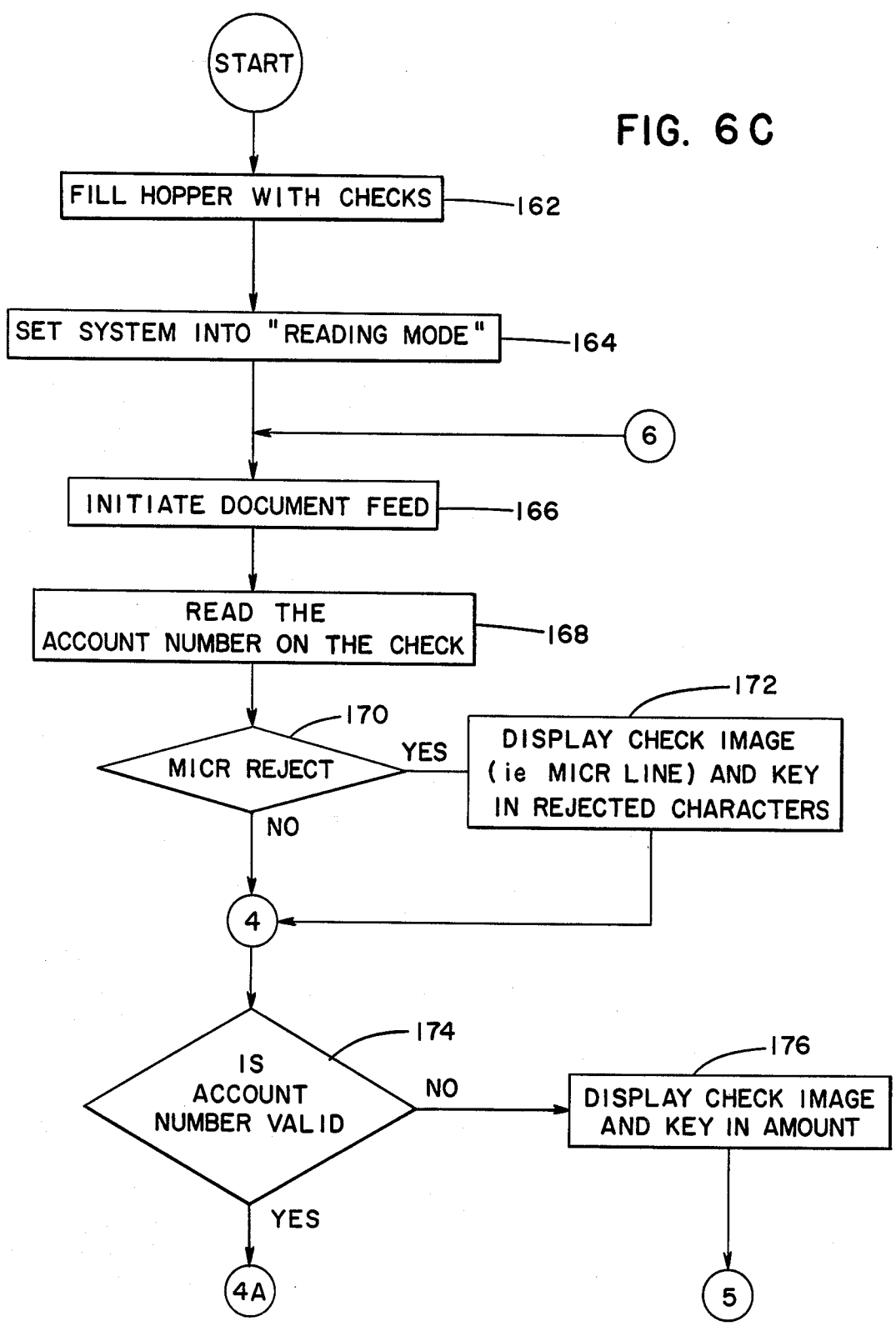

At the start of the next operation of the apparatus 20, the operator will fill the hopper module 22 (FIG. 1) with a number of checks which are to be processed as part of the bank proof operation (block 162) (FIG. 6C). The operator will then set the system into a reading mode (block 164) by depressing the "READ" control key 101 (FIG. 4) of the keyboard 26 and initiate a document feed (block 166) by depressing the "START" key 103 allowing the hopper module 22 to feed a document to a position adjacent the MICR reader 30 which reads the account number on the check (block 168) and transmits the data through the I/O module interface 120 (FIG. 5) for storage in the RAM unit 140. At this time, the system controller 108 (FIG. 2) will examine the account number (block 170) stored in the RAM unit 140 (FIG. 5) to see if a proper account number has been inserted. If the account number has not been properly read, the system controller 108 will display the account number of the check image on the CRT 28 and the operator will key in the rejected account number characters (block 172). After the account number has been properly entered into the system, the system controller 108 will then search the storage unit 41 (FIG. 2) to determine if the account number is stored therein (block 174). If an address corresponding to the account number is found in the storage unit 41, then the system controller 108 takes all the information stored in the storage unit 41 at that address and loads it (block 178) (FIG. 6D) into the RAM unit 140 (FIG. 5) prior to a recognition operation. The data stored in the RAM unit 140 is then transmitted through the I/O module interface 120 (FIG. 5) to the OCR reader 46 (FIG. 2) where it is stored into the reader memory for use in recognizing the written amount characters scanned by the reader 46. With this operation, the OCR reader 46 now knows where the amount character field 68 (FIG. 3) is located on the check 52, the type of amount character, i.e., whether it is a machine font or a hand print, recognition characteristics of all the written amount characters associated with one customer and other pertinent information which will allow it to read the written amount characters on the bank check. If the account number is found not to be in the storage unit 41, the system will display the check image allowing the operator to key in the amount utilizing the ten key section 76 of the keyboard (block 176) (FIG. 6C). The system will then continue with the bank proof processing of the check (block 186) (FIG. 6D).

Figure 6D:
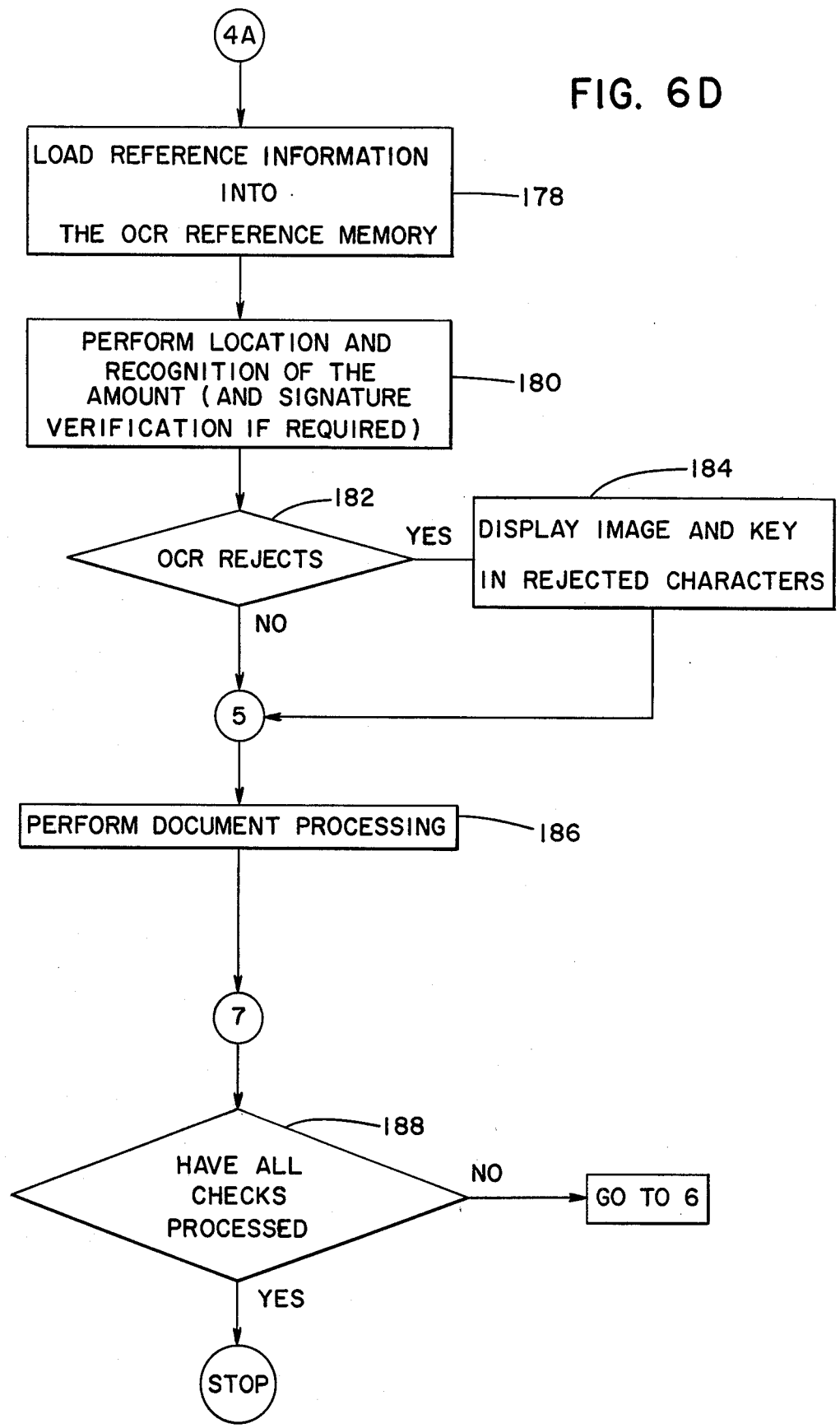

After the reference data stored at the address in the storage unit 41 corresponding to the account number read by the MICR reader 30 (FIGS. 1 and 2) has been inserted into the memory of the OCR reader 46 (FIG. 2), the reader 46 will scan the amount characters on the check and perform a recognition operation of the amount field 68 (FIG. 3) (block 180) (FIG. 6D). At this time, if a signature verification is required, the system may also recognize and determine if the handwritten signature is valid using recognition data concerning the handwriting of the customer generated in the same manner as the recognition data concerning the written amount character of the customer. If the system finds that it cannot read the written amount characters (block 182), the system will display the image of the check on the CRT 28 (FIG. 1) allowing the operator to key in the correct amount (block 184). The system will then continue the bank proof processing of the bank check which includes encoding of the amount read on the check, printing of the amount on the journal record and storing of the amount in the appropriate storage area in the storage unit 41 (block 186). The system will then check to see if all the documents have been processed (block 188) and if not, the system will initiate a new document feed (block 166) (FIG. 6C) and the process is repeated until all the checks have been processed.

It will be seen that the processing system disclosed provides a character recognition process which provides a high rate of correct readings of written amount characters by limiting the read operation to characters previously analyzed and in which recognition data has been generated. By using the account number as the identifying address, a simple and inexpensive reading method of recognizing written characters is provided.

While the invention has been shown and described in terms of a preferred embodiment thereof, it will be understood that this invention is not limited to this particular embodiment and that many changes and modifications may be made without departing from the true spirit and scope of the invention as defined in the appended claims. While the system has been disclosed utilizing a separate storage unit 41 and a recognition processor 40, it is obvious that a recognition processor 40 having the storage capacity could perform the recognition operation utilizing its own storage capacity and the data generated by the OCR reader 46 during the "READ" operation.

What is claimed is:

1. A system for processing documents encoded with alpha-numeric characters and containing human readable characters comprising:
   (a) storage means;
   (b) utilization means;
   (c) means for generating data including keyboard means for entering into said storage means the encoded alpha-numeric characters on the document and data locating the human readable characters on the document, said data being stored in said storage means at an address represented by the encoded alpha-numeric characters;
   (d) means for reading encoded alpha-numeric characters on a document being processed;
   (e) and means responsive to the reading of the encoded alpha-numeric characters for retrieving from said storage means and transferring to said utilization means the data locating the human readable characters on the document stored in said storage means at the address represented by the encoded alpha-numeric characters.

2. The processing system of claim 1 in which said data generating means further includes:
   (a) means for displaying the face of the document on which is located the encoded alpha-numeric characters and the human readable characters to be recognized;

(b) a grid pattern located on said displaying means and overlying the human readable characters on the face of the document displayed;

(c) and identifying characters located on said displaying means and associated with said grid pattern for locating the human readable characters of the displayed document on the grid pattern.

3. The processing system of claim 2 in which said keyboard means includes key members having indicia thereon corresponding to the identifying characters associated with said grid pattern for generating the data representing the location of the human readable characters on the document.

4. A system for processing bank checks magnetically encoded with a depositor's identification number and containing written amount characters comprising:
   (a) means for moving a train of bank checks through a feed path;
   (b) storage means;
   (c) utilization means;
   (d) means positioned adjacent the feed path for displaying the face of the bank check;
   (e) means overlying the face of the bank check for locating the written amount characters on the face of the bank check;
   (f) keyboard means operated in response to the displaying of the face of the bank check on said displaying means for generating data representing the depositor's identification number and the location of the written amount characters on the face of the bank check, said location data being stored in said storage means at an address represented by the identification number;
   (g) magnetic character reading means positioned adjacent the feed path for reading the identification number on each bank check moving through said feed path;
   (h) and means responsive to the reading of an identification number by said reading means for retrieving from said storage means and transferring to said utilization means the location data of the written amount on the bank check stored in the storage unit at an address corresponding to the identification number read by said reading means.

5. The processing system of claim 4 in which said displaying means comprises a CRT member, said overlying means comprises a grid pattern consisting of horizontal and vertical lines framing the face of said CRT member, said overlying means further including identifying characters located on the face of the CRT member and associated with the horizontal and vertical lines for locating the written amount characters on the bank check.

6. The processing system of claim 5 in which said keyboard means includes a plurality of key members having indicia thereon corresponding to the identifying characters associated with each line of the grid pattern enabling said key members when operated to generate the data representing the location of the written amount characters on the face of the bank check.

* * * * *